J. L. CREVELING.
ELECTRIC REGULATION.
APPLICATION FILED MAY 2, 1916. RENEWED JUNE 29, 1921.
1,419,494.
Patented June 13, 1922.
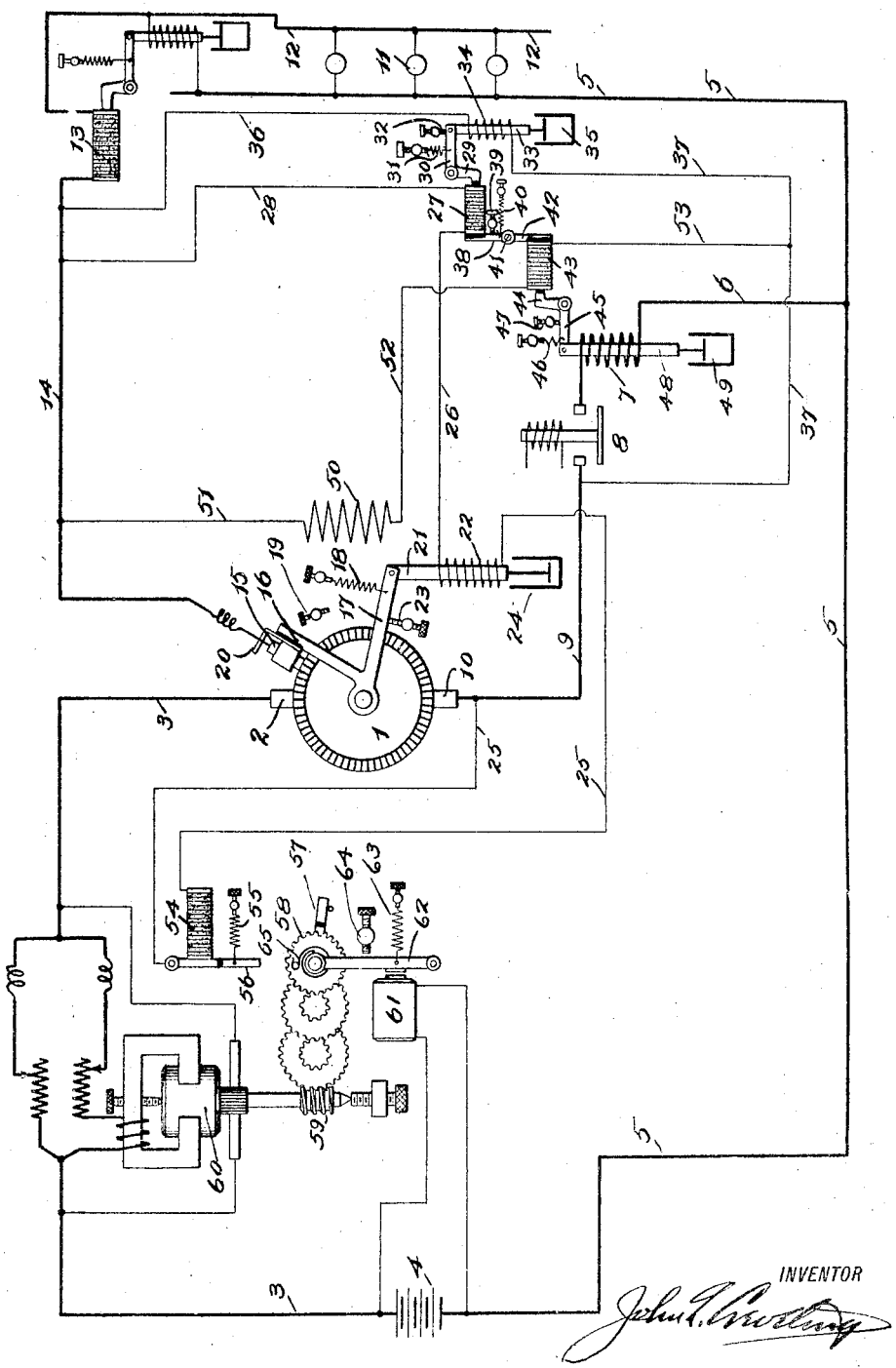
INVENTOR

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

1,419,494.  Specification of Letters Patent.  Patented June 13, 1922.

Application filed May 2, 1916, Serial No. 94,968. Renewed June 29, 1921. Serial No. 481,415.

*To all whom it may concern:*

Be it known that I, JOHN L. CREVELING, a citizen of the United States, residing at White Plains, in the county of Westchester and State of New York, have invented new and useful Improvements in Electric Regulations, set forth in the annexed specification and drawing forming a part thereof.

My invention pertains to that class of electric regulation wherein it is desired to regulate a controllable source of electrical potential difference, and has for its particular object to automatically control said source in a predetermined manner so as to properly cooperate with a storage battery or accumulator which may be used in conjunction therewith to supply translating devices.

My invention is particularly applicable to the art of lighting railway cars by power derived from the motion of the train and wherein, of course, the generator is subjected to wide fluctuations in speed, and wherein the translating devices must be held at substantially constant voltage throughout such fluctuations and supplied by the battery when the generator is not running. It is obvious that, when the generator is driven from a reversible source of power, some means must be provided to compensate for such reversals, but as such means form no part of my present invention they are purposely omitted for the sake of simplicity.

In the drawing, 1 represents the commutator of a generator, the positive brush 2 of which is connected as by lead 3 with the positive side of the storage battery 4, the negative of which is connected as by lead 5 with the lead 6 in connection with one end of the solenoid 7, the opposite terminal of which is connected with the automatic switch 8, having its opposite terminal connected as by lead 9 with the negative brush 10. The lead 5 is connected with the negative side of the lamps or other translating devices indicated at 11, the positive terminals of which are connected as by lead 12 with one side of any suitable translation circuit regulating device indicated as an automatically operated carbon pile resistance 13, having its remaining terminal connected as by lead 14 with the brush 15 in operative contact with the commutator 1 and mechanically supported by and electrically insulated from the arm or lever 16, arranged so as to be revolvable about the axis of revolution of the commutator 1, and have its position controlled by lever 17 normally drawn in an upward direction by adjustable spring 18 tending to bring the said lever into contact with the adjustable stop 19, in which position the brush 15 has its center line coinciding with the center line of the brush 2, while 20 represents any form of suitable electrical contacting device which may be used to cause electrical connection with the lead 3 when the brush 15 is in this position, and therefore electrically unite the leads 3 and 14 and short circuit the path connecting said leads through the brushes for a purpose which will hereinafter appear. 21 is a core of magnetic material surrounded by a solenoid 22 which when energized tends to draw the core 21 downwardly against the action of spring 18 and cause the brush 15 to be swung toward the brush 10, while the limit of movement that can be given the said brush may be determined by the adjustable screw 23, and too sudden movement resisted as by action of the dashpot 24. The wire 25, having in series therewith the carbon pile 54, connects one terminal of the solenoid 22 with the lead 9, and 26 connects the opposite terminal of the said solenoid with one end of the carbon pile 27, the opposite end of which is connected as by wire 28 with the lead 14. The resistance of carbon pile 27 is controlled by the lever 29, forming a bell crank lever with member 30, which member is normally drawn in an upward direction by adjustable spring 31, while its movement in said direction may be limited as by adjustable screw 32. The lever 30 carries at one extremity the core 33, surrounded by a solenoid 34, which when energized tends to move the said core downwardly, while too sudden movement is restrained by the dashpot 35. One end of solenoid 34 is connected with the lead 14, as by wire 36, while the remaining end is connected as by wire 37 with the lead 9. 38 is one limb of a lever pivoted at 41, and provided with the limb 42, and normally swung in a clockwise direction by the adjustable spring 40, while its limit of such revolution may be adjusted by the screw or stop 39. The limb 38 engages one end of the carbon pile 27 and tends to compress the same against the lever 29. The limb 42 engages one end of the carbon pile 43, the opposite end of which is engaged by the lever 44, which with the limb 45 forms a bell crank lever, the limb 45 of which is normally drawn in an upward direction by the adjustable spring 46 tending to compress the pile 43, while the movement given to the bell crank lever 44—45 by spring 46 may be limited by the adjustable screw or stop 47. 48 is a core of magnetic material, carried by the limb 45, and so disposed with regard to the solenoid 7 that energization of said solenoid tends to draw the core 48 downwardly against the action of spring 46 to reduce the pressure upon the carbon pile 43, as will hereinafter more plainly appear. 49 is a dashpot, preventing too sudden movement of the core 48. 50 is the field energizing coil of the generator, in this instance indicated as a plain shunt coil connected with the lead 14 as by wire 51, and with one end of the carbon pile 43, as by wire 52, the opposite end of said carbon pile being connected with the lead 9 through wires 53 and 37. 55 is an adjustable spring which normally tends to swing the lever 56 in a counter-clockwise direction and compress the pile 54 which is in series with the wire 25. 57 is a lever attached to the disc 58 which may be toothed and engage a pinion of a suitable gear train operated by the worm 59 driven by any suitable sort of a metering mechanism, in this instance indicated as provided with a driving armature 60 which rotates in one direction or the other depending upon whether current is being supplied to the battery or delivered by the battery. Further detailed description of the metering mechanism is purposely omitted, as this type of apparatus is now well-known in the art. The metering device is so arranged that current flowing from the generator to the battery tends to revolve the lever 57 in a counter-clockwise direction, and therefore the said lever when brought in contact with the lever 56, if its motion be continued, will vary the resistance of the carbon pile 54 as will hereinafter be more fully pointed out. 61 is a magnet in shunt across the battery or charging circuit, and when the battery is at or about its normal working voltage or above a predetermined minimum the said magnet holds the lever 62 in the position shown in the drawing against the tension of spring 63 tending to swing the said lever against the stop 64. If the battery voltage fall below a predetermined degree the lever 62 will be released by magnet 61 and the gear 58 thrown out of mesh, whereupon the spring 65 will return the lever 57 to the position shown in the drawing.

An operation of my invention is substantially as follows:

If the generator be at rest, the main switch 8 will be open, as shown in the drawing, it being understood that the switch, having its presence merely indicated at 8, may be any of the well-known types of automatic switch adapted to close the circuit when the voltage of the generator is substantially equal to that of the battery and to open the same when the battery tends to back discharge through the generator, and the lamps or other translating devices 11 may be fed by the storage battery 4 through the following circuits.

Current from the battery will flow through lead 3 and the metering mechanism provided with the armature 60 and cause the same to so revolve as to tend to swing lever 57 in a clockwise direction, and then to brush 2, thence (if the brushes be in the positions shown in the drawing) through a portion of the commutator 1 and its connecting windings to brush 15, thence through lead 14, regulator 13 and lead 12 to the lamps 11, from which return is made through the lead 5. It will be obvious that it is desirable, under these conditions, that little current will be forced to traverse the commutator and armature, and I therefore so adjust the spring 18 and the spring 31 and carbon pile 27 that, if the generator voltage be substantially equal to or below that desired upon the translating devices, the spring 31 will hold the lever 30 against the stop 32, and the spring 40 will hold the lever 38 against the stop 39, and carbon pile 27 will have sufficient resistance that the current flowing through the coil 22 in series with the said pile will not be sufficient to overcome the spring 18, which will then swing the brush 15 in a counter-clockwise direction and bring the lever 17 to its stop 19, whereupon the brush 15 and brush 2 will have their axes in the same plane, and the lead 14 will be electrically connected with the lead 3, by means of the device indicated at 20. And this is, of course, the position of brush 15 when the generator is running at low speed or stationary. If the battery voltage be above that desired on the translating devices 11, the automatic regulator 13 will introduce a drop in the well-known manner and cause the proper potential to be applied across the translating devices. If, now, the generator be started up (it being remembered that brushes 2 and 15 are still considered with their axes in the same plane) when the voltage of the generator is substantially equal to that of the storage battery, the switch 8 will close and then a further increase in speed of the generator will cause it to tend to supply current to the lamps or translating devices and to the storage battery 4, return from both of which will be made through the lead 5, lead 6, solenoid 7, switch 8 and lead 9 to the negative brush 10, that portion of the current supplied to the battery traversing the metering mechanism and causing its armature 60 to revolve in such direction as to tend to swing the lever 57 in a counter-clockwise direction. In the arrangement shown, the generator current will all traverse the solenoid 7, and I so adjust the spring 46 that in case at any time the current in this circuit be so great as to endanger the dynamo or tend to exceed any predetermined maximum, the coil 7 will cause the core 48 to be lowered against the action of spring 46, and through lever 45—44 reduce the pressure upon the carbon pile 43, and increase its resistance, in such manner as to cut down the field excitation of the coil 50 and prevent the generator from delivering a current in excess of this predetermined maximum or protective value. The current flowing to the storage battery through the lead 3 to the lead 5, and the current flowing to the translating devices through the lead 14, regulator 13 and lead 12 to the lead 5, will, when the brushes 2 and 15 have their axes in the same plane, be of equal voltages at the generator.

It is of course necessary, as well known in the art, to impress upon a storage battery a higher voltage, in order to charge the same, than is impressed upon a circuit supplied by the said battery, and when the voltage of the generator tends to increase with its speed appreciably above that of the translation circuit voltage, the current flowing through the voltage coil 34, from the lead 14 to the lead 9, will tend to swing the lever 30 downwardly against the action of spring 31, and compress the pile 27 so as to strengthen the coil 22, in such manner as to swing the brush 15 in a clockwise direction. And I so adjust the spring 31 and other instrumentalities cooperating with the voltage coil 34 that the said coil 34 will, as the generator speed increases, hold approximately the desired voltage across its circuit by, first, compressing the carbon pile 27 as the speed increases, and then, upon further tendency of the voltage to increase, by swinging lever 38—42 about the pivot 41 against the action of spring 40 so as to lessen the pressure upon the carbon pile 43 and decrease the current in the field exciting coil 50, which may hold the generator voltage from exceeding a predetermined limit regardless of speed increases. The first effect of the coil 34 in causing the brush 15 to be swung in the clockwise direction, as described, will cause a difference in potential between brush 2 and brush 15, which is that difference desired to have applied upon the battery charging circuit in excess of that upon the translating circuit during charging, or substantially such value. Therefore, the battery is charged at a higher voltage than is supplied to the work circuit, notwithstanding the regulation of the generator is accomplished by regulating the voltage across the work circuit, and the generator is at all times protected from overload through the instrumentality of the solenoid 7 and its cooperating mechanism, as previously described. If the generator slow down and stop, substantially the reverse of the above outlined operation will take place. However, if the generator has been running for considerable time, and the battery charged until it is capable of delivering current to line at a voltage quite in excess of that desired upon the translating devices, the translating voltage will be held constant by the regulator 13, while during the slowing down process solenoid 34 will cause the current in the coil 22 to be sufficient that there will be a displacement of the brushes 2 and 15 with regard to each other, causing a back voltage tending to oppose the battery voltage and supply the proper voltage to line. It will be noted that the translation circuit regulator 13 will operate to cause a considerable drop only when the battery is supplying the circuit, and this when at a voltage in excess of that desired upon the translating devices. Of course, the regulator 13 will cause a loss in energy, but this is only for a short period, as the voltage of the battery soon drops to its normal voltage when carrying a load.

If the battery at any time shall have received the full amount of current predetermined as its full charge and which the metering mechanism may be adjusted to measure out, then lever 57 will come into contact with lever 56 and further supply of current to the battery will cause further movement of the lever 57 in a counter-clockwise direction and a lessening of the pressure upon the pile 54 and increase in the resistance of the said pile which is in series with the coil 22. Thus the current in the coil 22 will be weakened and gradually allow spring 18 to shift brush 15 in a counter-clockwise direction and lessen the difference between the voltage upon the battery circuit and that held constant by the coil 34, and therefore lessen the voltage impressed upon the battery and the current supplied thereto. In this way the metering mechanism will automatically cause the battery charging current to be cut down or suppressed when the battery has received a predetermined charge. Discharge of the battery will, of course, produce the reverse effect and if at any time the battery be discharged to where its voltage fall below a predetermined limit, the metering mechanism will be reset to measure out a full charge to the battery, inasmuch as the magnet 61 will release the lever 62 which will cause the lever 57 to be returned to its initial position as shown in the drawing, from which position it requires a full charge to bring the lever 57 against the lever 56 and reduce or terminate the charging current.

From the foregoing it will be noted that I have produced a system wherein a higher voltage is automatically maintained upon the battery than upon the work circuit and that the generator is automatically governed throughout speed changes in response to fluctuations in voltage across the work circuit, and that when the battery has received its full charge the charging rate will be cut down or suppressed, as may be desired, by lessening the increase in voltage across the battery above that impressed upon the work circuit. It will further be noted that if at any time an overload is thrown upon the generator the solenoid 7 will increase the resistance 43 and prevent the generator current output from exceeding its predetermined limit.

I do not wish in any way to limit myself to the exact constructions nor to the exact mode of operation set forth in this specification for the purpose of merely illustrating one embodiment of my invention, for it is obvious that wide departure may be made therein without departing from the spirit and scope of my invention which is set forth in the following claims:

1. Means for operating a storage battery and translating devices in cooperation with a controllable source of electrical potential difference comprehending means for charging a storage battery and operating translating devices from said source at unequal values of potential difference derived therefrom and unequal at their points of derivation, means for controlling said source in response to fluctuations tending to take place in the translating devices, and means cooperating therewith affected by the current supplied to the battery.

2. Means for operating a storage battery and translating devices in cooperation with a controllable source of electrical potential difference comprehending means for charging a storage battery and operating translating devices from said source at different values of potential difference derived therefrom, means for controlling said source in response to fluctuations tending to take place in the translating devices, and means cooperating therewith affected by the current supplied by the battery.

3. Means for operating a storage battery and translating devices in cooperation with a controllable source of electrical potential difference comprehending means for charging a storage battery and operating translating devices from said source at different values of potential difference derived therefrom, means for controlling said source in response to fluctuations tending to take place in the translating devices, and means cooperating therewith affected by the current supplied to and by the battery.

4. Means for operating a storage battery and translating devices in cooperation with a controllable source of electrical potential difference comprehending means for charging a storage battery and operating translating devices from said source at different values of potential difference derived therefrom, automatic means for controlling said source in response to fluctuations tending to affect the translating devices, and means for affecting the regulation of the source affected by the current supplied to the battery.

5. Means for operating a storage battery and translating devices in cooperation with a controllable source of electrical potential difference comprehending means for charging a storage battery and operating translating devices from said source at different values of potential difference derived therefrom, automatic means for controlling said source in response to fluctuations tending to affect the translating devices, and means for affecting the regulation of the source affected by the current supplied by the battery.

6. Means for operating a storage battery and translating devices in cooperation with a controllable source of electrical potential difference comprehending means for charging a storage battery and operating translating devices from said source at different values of potential difference derived therefrom, automatic means for controlling said source in response to fluctuations tending to affect the translating devices, and means for affecting the regulation of the source affected by the current supplied to and by the battery.

7. Means for operating a storage battery and translating devices in cooperation with a controllable source of electrical potential difference comprehending means for charging a battery and operating translating devices from said source at different values of electrical potential difference derived therefrom, automatic means for controlling both of said values of electrical potential difference derived from said source in response to fluctuations in electrical potential difference tending to take place across the translating devices, and means for affecting the operation of the controlling means affected by the current supplied to the battery.

8. Means for operating a storage battery and translating devices in cooperation with a controllable source of electrical potential difference comprehending means for charging a battery and operating translating devices from said source at different values of electrical potential difference derived therefrom, automatic means for controlling both of said values of electrical potential difference derived from said source in response to fluctuations in electrical potential difference tending to take place across the translating devices, and means for affecting the operation of the controlling means affected by the current supplied by the battery.

9. Means for operating a storage battery and translating devices in cooperation with a controllable source of electrical potential difference comprehending means for charging a battery and operating translating devices from said source at different values of electrical potential difference derived therefrom, automatic means for controlling both of said values of electrical potential difference derived from said source in response to fluctuations in electrical potential difference tending to take place across the translating devices, and means for affecting the operation of the controlling means affected by the current supplied to and by the battery.

10. The combination with a generator, a storage battery and translating circuit, of means for imposing different values of electrical potential difference derived from said generator upon said battery and said translating circuit, automatic means for controlling both said values in response to fluctuations tending to take place in the translating circuit, and means for affecting the control of said source affected by the current delivered to the battery.

11. The combination with a generator, a storage battery and translating circuit, of means for imposing different values of electrical potential difference derived from said generator upon said battery and said translating circuit, automatic means for controlling both said values in response to fluctuations tending to take place in the translating circuit, and means for affecting the control of said source affected by the current delivered by the battery.

12. The combination with a generator, a storage battery and translating circuit, of means for imposing different values of electrical potential difference derived from said generator upon said battery and said translating circuit, automatic means for controlling both said values in response to fluctuations tending to take place in the translating circuit, and means for affecting the control of said source affected by the current delivered to and by the battery.

13. The combination with a generator, a storage battery, a translating circuit and means for imposing different values of electrical potential difference derived from said generator upon said battery and said translating circuit and automatic means for controlling both said values and the difference therebetween in response to fluctuations tending to take place in the translating circuit, of means for affecting the control of said generator affected by the current supplied to the battery.

14. The combination with a generator, a storage battery, a translating circuit and means for imposing different values of electrical potential difference derived from said generator upon said battery and said translating circuit and automatic means for controlling both said values and the difference therebetween in response to fluctuations tending to take place in the translating circuit, of means for affecting the control of said generator affected by the current supplied by the battery.

15. The combination with a generator, a storage battery, a translating circuit and means for imposing different values of electrical potential difference derived from said generator upon said battery and said translating circuit and automatic means for controlling both said values and the difference therebetween in response to fluctuations tending to take place in the translating circuit, of means for affecting the control of said generator affected by the current supplied to and by the battery.

16. The combination with a generator, a storage battery, a translating circuit, means for simultaneously imposing different values of electrical potential difference derived at different values from said generator upon said battery and said translating circuit, and automatic means for controlling the difference between said values, of means for affecting the control of the generator affected by the current supplied to the battery.

17. The combination with a generator, a storage battery, a translating circuit, means for imposing unequal values of electrical potential difference derived from said generator upon said battery and said translating circuit, said values being unequal at the generator, and automatic means for controlling the difference between said values, of means for affecting the control of the generator affected by the current supplied by the battery.

18. The combination with a generator, a storage battery, a translating circuit, means for imposing unequal values of electrical potential difference derived from said generator upon said battery and said translating circuit, said values being unequal at the generator, and automatic means for controlling the difference between said values, of means for affecting the control of the generator affected by the current supplied to and by the battery.

19. The combination with a generator, a storage battery, a translating circuit, means for imposing different values of electrical potential difference derived from said generator upon said battery and said translating circuit, automatic means for controlling both said values and the difference therebetween in response to fluctuations tending to take place in the translating circuit, of means for affecting the difference between said values affected by the current supplied to the battery.

20. The combination with a generator, a storage battery, a translating circuit, means for imposing different values of electrical potential difference derived from said generator upon said battery and said translating circuit, automatic means for controlling both said values and the difference therebetween in response to fluctuations tending to take place in the translating circuit, of means for affecting the difference between said values affected by the current supplied by the battery.

21. The combination with a generator, a storage battery, a translating circuit, means for imposing different values of electrical potential difference derived from said generator upon said battery and said translating circuit, automatic means for controlling both said values and the difference therebetween in response to fluctuations tending to take place in the translating circuit, of means for affecting the difference between said values affected by the current supplied to and by the battery.

22. The combination with a generator, a storage battery, a translating circuit, means for imposing different values of electrical potential difference derived from said generator upon said battery and said translating circuit, and automatic means for controlling both said values and the difference therebetween, of means for controlling the charge to the battery by affecting the difference between said values.

23. The combination with a generator, a storage battery, a translating circuit, means for imposing different values of electrical potential difference derived from said generator upon said battery and said translating circuit, and automatic means for controlling both said values and the difference therebetween, of means for controlling the charge to the battery comprehending means for affecting the difference between said values.

24. The combination with a storage battery, translating devices, a controllable source of potential difference tending to vary, and means for supplying current to the battery and translating devices at different values of potential difference from said source, and means for controlling the source in response to fluctuations tending to take place in the value of the lower potential difference and automatic means for varying the value of the difference between the said potential differences, of means for affecting the value between said differences depending upon the current supplied to the battery.

25. The combination with a storage battery, translating devices, a controllable source of potential difference tending to vary, and means for supplying current to the battery and translating devices at different values of potential difference from said source, and means for controlling the source in response to fluctuations tending to take place in the value of the lower potential difference and automatic means for varying the value of the difference between the said potential differences, of means for affecting the value between said differences depending upon the current supplied by the battery.

26. The combination with a storage battery, translating devices, a controllable source of potential difference tending to vary, and means for supplying current to the battery and translating devices at different values of potential difference from said source, and means for controlling the source in response to fluctuations tending to take place in the value of the lower potential difference and automatic means for varying the value of the difference between the said potential differences, of means for affecting the value between said differences depending upon the current supplied to and by the battery.

JOHN L. CREVELING.